United States Patent
Hashimoto et al.

(10) Patent No.: US 10,513,452 B2
(45) Date of Patent: Dec. 24, 2019

(54) WATER TREATMENT SYSTEM

(71) Applicants: MITSUBISHI HEAVY INDUSTRIES ENGINEERING, LTD., Yokohama-shi, Kanagawa (JP); Naikai Salt Industries Co., LTD., Kurashiki-shi, Okayama (JP); AQUA SYSTEMS LIMITED, Takasago-shi, Hyogo (JP); Tsuneo Kishi, Takasago-shi, Hyogo (JP)

(72) Inventors: Yuta Hashimoto, Tokyo (JP); Hideo Iwahashi, Tokyo (JP); Katsunori Matsui, Tokyo (JP); Kiichi Tokunaga, Tokyo (JP); Takeshi Yasunaga, Tokyo (JP); Masayuki Tabata, Tokyo (JP); Yoshiaki Ito, Tokyo (JP); Kazuhisa Takeuchi, Tokyo (JP); Yasuhide Gouda, Tamano (JP); Masahiro Kishi, Takasago (JP)

(73) Assignees: MITSUBISHI HEAVY INDUSTRIES ENGINEERING, LTD., Yokohama-shi (JP); NAIKAI SALT INDUSTRIES CO., LTD., Kurashika-shi (JP); AQUA SYSTEMS LIMITED, Takasago-shi (JP)

( * ) Notice: Subject to any disclaimer, the term of this patent is extended or adjusted under 35 U.S.C. 154(b) by 955 days.

(21) Appl. No.: 14/893,731

(22) PCT Filed: Jul. 1, 2014

(86) PCT No.: PCT/JP2014/067515
§ 371 (c)(1),
(2) Date: Nov. 24, 2015

(87) PCT Pub. No.: WO2015/002186
PCT Pub. Date: Jan. 8, 2015

(65) Prior Publication Data
US 2016/0115055 A1 Apr. 28, 2016

(30) Foreign Application Priority Data

Jul. 3, 2013 (JP) .................. 2013-140013

(51) Int. Cl.
*C02F 3/06* (2006.01)
*B01D 61/12* (2006.01)
(Continued)

(52) U.S. Cl.
CPC .............. *C02F 3/06* (2013.01); *B01D 61/025* (2013.01); *B01D 61/12* (2013.01); *C02F 1/441* (2013.01);
(Continued)

(58) Field of Classification Search
CPC .... C02F 3/06; C02F 3/10; C02F 3/104; C02F 3/107; C02F 3/1278; C02F 1/441;
(Continued)

(56) References Cited

U.S. PATENT DOCUMENTS

2004/0244715 A1  12/2004 Schreier et al.

FOREIGN PATENT DOCUMENTS

EP  2 508 481 A1  10/2012
JP  6-170383 A  6/1994
(Continued)

OTHER PUBLICATIONS

English translated version of JP 2001070967.*
(Continued)

*Primary Examiner* — Robert Clemente
*Assistant Examiner* — Akash K Varma
(74) *Attorney, Agent, or Firm* — Westerman, Hattori, Daniels & Adrian, LLP

(57) ABSTRACT

This water treatment system is provided with: a reverse osmosis membrane device; a biofilm treatment device that has a carrier, on a surface of which is formed a biofilm, and
(Continued)

that treats water to be treated before the water to be treated is transmitted through the reverse osmosis membrane device; and at least one of a water to be treated stoppage period circulation means and a water to be treated stoppage period supply means that are driven when the intake of new water to be treated is stopped. The water to be treated stoppage circulation means supplies and circulates water to be treated from a water to be treated discharge outlet side of the biofilm treatment device to a water to be treated supply port side. The water to be treated stoppage period supply means supplies new water to be treated to the biofilm treatment device.

12 Claims, 1 Drawing Sheet

(51) Int. Cl.
  *B01D 61/02* (2006.01)
  *C02F 1/00* (2006.01)
  *C02F 1/44* (2006.01)
  *C02F 1/70* (2006.01)
  *C02F 1/76* (2006.01)
  *C02F 3/10* (2006.01)
  *C02F 103/08* (2006.01)
  *C02F 3/12* (2006.01)

(52) U.S. Cl.
  CPC ...... *B01D 2311/04* (2013.01); *B01D 2311/12* (2013.01); *B01D 2311/2665* (2013.01); *B01D 2311/2688* (2013.01); *C02F 1/008* (2013.01); *C02F 1/70* (2013.01); *C02F 1/76* (2013.01); *C02F 3/10* (2013.01); *C02F 3/104* (2013.01); *C02F 3/107* (2013.01); *C02F 3/1278* (2013.01); *C02F 2103/08* (2013.01); *C02F 2209/04* (2013.01); *C02F 2209/08* (2013.01); *C02F 2209/20* (2013.01); *C02F 2209/22* (2013.01); *C02F 2301/046* (2013.01); *C02F 2303/185* (2013.01); *C02F 2303/20* (2013.01); *C02F 2305/06* (2013.01); *Y02A 20/131* (2018.01); *Y02W 10/15* (2015.05)

(58) Field of Classification Search
  CPC .... C02F 1/008; C02F 1/70; C02F 1/76; C02F 1/00; C02F 1/44; B01D 61/025; B01D 61/12; B01D 61/02
  See application file for complete search history.

(56) References Cited

FOREIGN PATENT DOCUMENTS

| JP | 07-256283 | A | | 10/1995 | |
|----|-----------|---|---|---------|---|
| JP | 8-323117 | A | | 12/1996 | |
| JP | 9-187783 | A | | 7/1997 | |
| JP | 2001-070967 | A | | 3/2001 | |
| JP | 2001070967 | A | * | 3/2001 | ................ C02F 3/08 |
| JP | 2004-25018 | A | | 1/2004 | |
| JP | 2005-110619 | A | | 4/2005 | |
| JP | 2008-296188 | A | | 12/2008 | |
| JP | 2008296188 | A | * | 12/2008 | ............. B01D 61/04 |
| JP | 2013-111559 | A | | 6/2013 | |
| WO | 2011/026521 | A1 | | 3/2011 | |
| WO | 2012/104684 | A1 | | 8/2012 | |

OTHER PUBLICATIONS

English translated version of JP 2008-296188.*
International Search Report dated Sep. 16, 2014, in counterpart International Application No. PCT/JP2014/067515, with English translation (4 pages).
Written Opinion dated Sep. 16, 2014, in counterpart International Application No. PCT/JP2014/067515, with English translation (7 pages).
Extended (supplementary) European Search Report dated May 20, 2016, issued in counterpart European Patent Application No. 14819445.9. (8 pages).

* cited by examiner

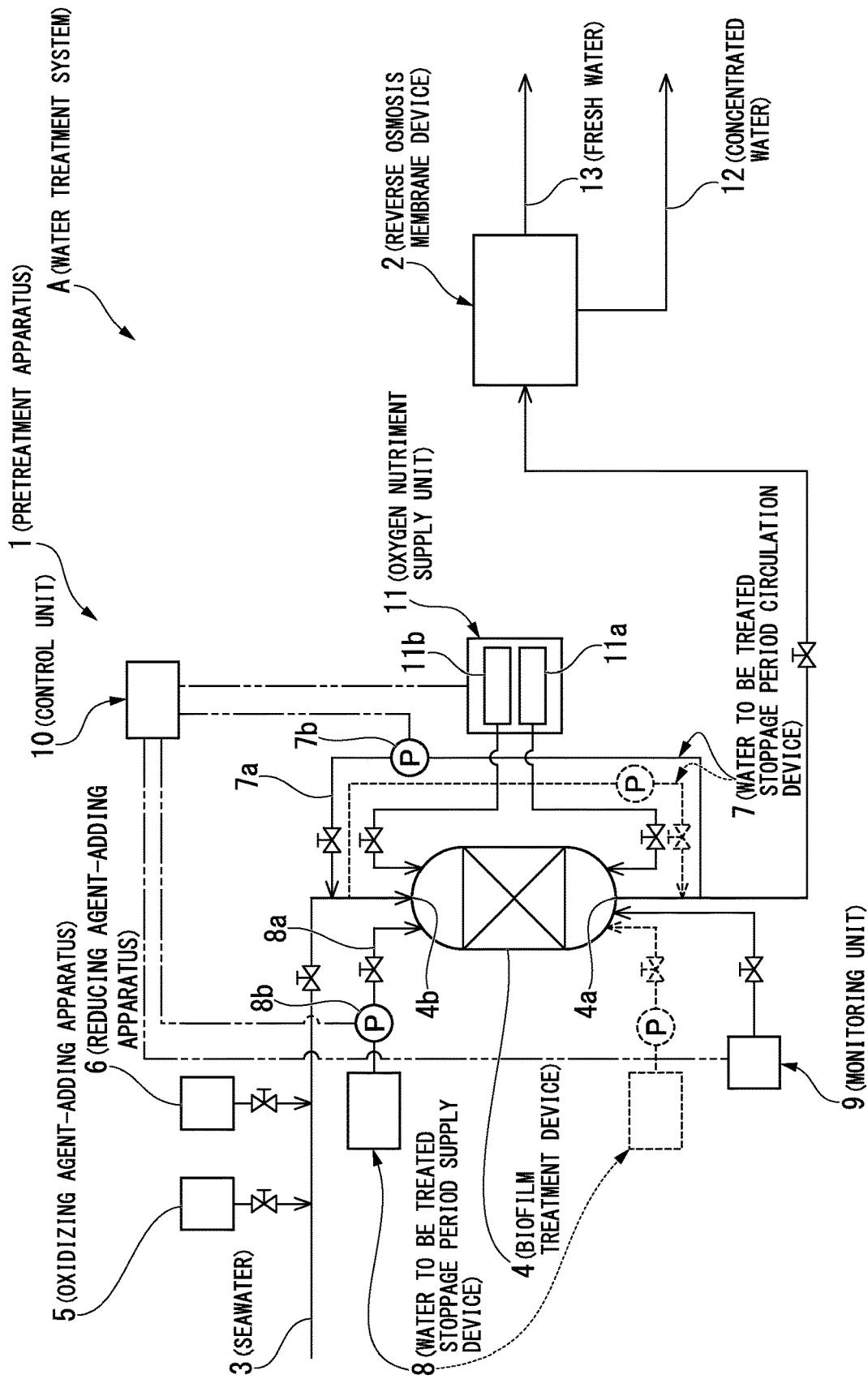

WATER TREATMENT SYSTEM

TECHNICAL FIELD

The present invention relates to a water treatment system, and more particularly, to a water treatment system appropriate for use in the production of fresh water from seawater.

BACKGROUND ART

Desert regions, isolated islands, developing countries, industrial areas that require a large amount of fresh water, and so on, are examples of many regions in which a serious water shortage occurs chronically or seasonally as there is no fresh water source such as a river, a lake, or the like, and thus, a sufficient fresh water source is not available, or it is impossible to rely on rainwater due to climate characteristics. In parts of such regions, fresh water (drinking water) is produced by treating seawater, which is present in large quantities. As a method of producing fresh water, a method of filtering fresh water by passing seawater through a reverse osmosis membrane (a RO membrane) such as a hollow fiber membrane, a spiral membrane, or the like may be used.

Meanwhile, when fresh water is produced from seawater, the seawater needs to be pretreated before being passed through the reverse osmosis membrane. In the pretreatment, in general, in order to prevent biofouling by algae, shellfish, and so on, of a water intake port, a pipeline or a waterway configured to collect seawater, an oxidizing agent such as hypochlorous acid or the like is added. In addition, an inorganic coagulant such as ferric chloride or the like, or a polymer coagulant such as PAC or the like is added to an aggregate-suspended solid such as particulates, colloids, or the like in seawater, and filtered through a sand filter or a cartridge filter apparatus (CF) to remove the suspended solid in the seawater.

When a chlorine-based oxidizing agent remains, oxidation of the reverse osmosis membrane occurs, and thus, a decrease in membrane performance of the reverse osmosis membrane occurs. For this reason, before the seawater penetrates through the reverse osmosis membrane, a reducing agent such as sodium bisulfate (SBS) or the like is added while measuring an oxidation-reduction potential, to perform neutralization (for example, see Patent Literature 1).

When such pretreatment of seawater is performed, it is possible to prevent biofouling of the water intake port, the pipeline, the waterway, and so on, that are configured to collect the seawater, and early drop (fouling) of a membrane performance of the reverse osmosis membrane due to organism proliferation or silting of the suspended solid, and to efficiently and economically produce fresh water.

CITATION LIST

Patent Literature

[Patent Literature 1]
Japanese Unexamined Patent Application, First Publication No. 2008-296188

SUMMARY

Technical Problem

The applicant has filed an application related to a water treatment technology (a technology of producing fresh water from seawater) using a biofilm treatment device (a biofilm filtration device) for forming biofilm on a surface of a carrier (a filter material) such as sand or the like, instead of a sand filter (Japanese Patent Application No. 2011-262507). In the biofilm treatment device, the microorganisms of the biofilm perform an important role in removal (capture, biodegradation) of the suspended solid in the seawater, and thus, filtration performance can be maintained. For this reason, in comparison with the water treatment system of the related art, fresh water can be more efficiently and economically produced without use of chemicals such as coagulant or the like.

However, in the above-mentioned water treatment system including the biofilm treatment device, when a system plant is stopped due to inspection, contingencies, or the like, the flow of seawater to the biofilm treatment device is blocked. For this reason, when a certain length of time has elapsed due to such stoppage, the inside of the biofilm treatment device becomes an anaerobic condition. As a result, activity of microorganisms of the biofilm is decreased, and further, the microorganisms of the biofilm may become nonexistent. Accordingly, there is room for improvement in that predetermined membrane performance and filtration performance of the biofilm of the biofilm treatment device when an operation is restarted may not be obtained.

Solution to Problem

In order to achieve the aforementioned objects, a water treatment system according to a first aspect of the present invention includes a reverse osmosis membrane device configured to separate water to be treated into concentrated water having high solute concentration and fresh water, the water treatment system including a biofilm treatment device comprising a carrier having biofilm formed on a surface thereof and configured to treat the water to be treated before passing through the reverse osmosis membrane device; and at least one of a water to be treated stoppage period circulation device operated when intake of new water to be treated is stopped and configured to supply and circulate the water to be treated from a discharge port of the water to be treated side of the biofilm treatment device toward a supply port of the water to be treated or from the supply port of the water to be treated side toward the discharge port of the water to be treated side, and a water to be treated stoppage period supply device configured to supply the new water to be treated to the biofilm treatment device.

According to the above-mentioned configuration, when the system plant is stopped due to inspection, contingencies, or the like, and intake of the water to be treated such as new seawater or the like is stopped, the water to be treated can be circulated and supplied to the biofilm treatment device by the water to be treated stoppage period circulation device. In addition, the new water to be treated can be supplied to the biofilm treatment device using, for example, the new water to be treated that is previously separately prepared, the new water to be treated held in the plant during stoppage, and so on, by the water to be treated stoppage period supply device.

Accordingly, even when the system plant is stopped due to inspection, contingencies, or the like, and intake of the new water to be treated is stopped, as the water to be treated stoppage period circulation device and the water to be treated stoppage period supply device are appropriately operated, oxygen, nutriment, or the like necessary for the microorganism of the biofilm can be supplied into the biofilm treatment device, and the biofilm can be maintained in an appropriate state.

In the water treatment system, a monitoring unit configured to monitor ingredients in the water to be treated consumed by the biofilm of the biofilm treatment device may be provided.

According to the above-mentioned configuration, as the ingredients in the water to be treated are consumed by the biofilm, i.e., the ingredients existing in the water to be treated required for growth and development of the microorganism of the biofilm, for example, nutriments such as oxygen, phosphorus, nitrogen, organic matter, or the like, are monitored by the monitoring unit, the ingredient amount in the water to be treated in the biofilm treatment device can be checked. Accordingly, the state of the microorganism of the biofilm (activity, the number of microorganisms, or the like) can be checked. Based on this, determination of the operation or stoppage of the water to be treated stoppage period circulation device or the water to be treated stoppage period supply device can be appropriately performed.

In the water treatment system, a control unit configured to control operation and stoppage of at least one of the water to be treated stoppage period circulation device and the water to be treated stoppage period supply device may be provided.

According to the above-mentioned configuration, for example, the stoppage of the system plant due to inspection, contingencies, or the like, and a predetermined time elapsed from the stoppage are detected, and simultaneously, at least one of the water to be treated stoppage period circulation device and the water to be treated stoppage period supply device can be controlled, to be operated by the control unit. In addition, during the stoppage of the system plant, an amount of the ingredients such as oxygen, nutriment, or the like required for growth and development of the microorganism of the biofilm in the water to be treated is monitored by the monitoring unit or the like. Based on this, at least one of the water to be treated stoppage period circulation device and the water to be treated stoppage period supply device can be intermittently operated or stopped by the control unit. In addition, it is also considered that the ingredients such as oxygen, nutriment, or the like in the water to be treated are varied by, for example, seasons or times (the rise and fall of the tide). For this reason, based on the above-mentioned seasonal conditions or the like, at least one of the water to be treated stoppage period circulation device and the water to be treated stoppage period supply device can be controlled to be operated by the control unit. Accordingly, the performance of the biofilm treatment device can be efficiently and economically maintained.

In the water treatment system, an oxygen nutriment supply unit configured to selectively supply a gas including oxygen and nutriment of a microorganism that forms the biofilm to at least one of water to be treated circulated by the water to be treated stoppage period circulation device and new water to be treated supplied by the water to be treated stoppage period supply device when at least one of the water to be treated stoppage period circulation device and the water to be treated stoppage period supply device is operated may be provided.

According to the above-mentioned configuration, oxygen (gas including oxygen) and nutriment can be selectively supplied to the water to be treated circulated and supplied into the biofilm treatment device by the oxygen nutriment supply unit.

Accordingly, for example, only oxygen is supplied when the water to be treated is circulated by the water to be treated stoppage period circulation device, and the oxygen and the nutriment can be appropriately selectively supplied to the water to be treated, for example, both of the oxygen and the nutriment are supplied or an insufficient amount of one is supplied. Accordingly, the biofilm can be maintained in an appropriate state with higher precision.

In the water treatment system, the oxygen nutriment supply unit may supply the gas including oxygen from a lower side of the discharge port of the water to be treated side of the biofilm treatment device.

According to the above-mentioned configuration, as oxygen (gas including oxygen) is supplied from the lower side of the biofilm treatment device by the oxygen nutriment supply unit, the oxygen can be supplied into the biofilm treatment device while floating. Accordingly, the oxygen can be prevented from being locally supplied in the biofilm treatment device, and the oxygen can be widely supplied into the biofilm treatment device. For this reason, the biofilm can be maintained in an appropriate state with higher precision. In addition, as the gas including oxygen is supplied into biofilm treatment device while floating as described above, an action of agitating and mixing the inside of the biofilm treatment device is also obtained. For this reason, not only the oxygen but also the nutriment can also be widely supplied into the biofilm treatment device.

In the water treatment system, a supply amount of new water to be treated supplied by the water to be treated stoppage period supply device and a supply amount of the gas including oxygen and the nutriment of the microorganism selectively supplied by the oxygen nutriment supply unit may be controlled based on a monitoring result by the monitoring unit.

According to the above-mentioned configuration, based on the monitoring result by the monitoring unit, the supply amount of the new water to be treated by the water to be treated stoppage period supply device and the supply amount of the gas including oxygen and the nutriment selectively supplied by the oxygen nutriment supply unit are controlled. Accordingly, the biofilm can be maintained in an appropriate state with higher precision. In addition, the supply amount of the new water to be treated by the water to be treated stoppage period supply device and the supply amount of the gas including oxygen and the nutriment selectively supplied by the oxygen nutriment supply unit are automatically controlled by the control unit that has received the monitoring result. In this case, the biofilm can be maintained more efficiently and effectively.

Advantageous Effects of Invention

In the water treatment system, when a system plant is stopped due to inspection, contingencies, or the like and intake of water to be treated such as new seawater or the like is stopped, the water to be treated can be circulated and supplied to the biofilm treatment device by the water to be treated stoppage period circulation device. In addition, the new water to be treated can be supplied to the biofilm treatment device by the water to be treated stoppage period supply device. Accordingly, even when intake of new water to be treated is stopped, as the water to be treated stoppage period circulation device and the water to be treated stoppage period supply device are operated, oxygen, nutriment, or the like necessary for the microorganism of the biofilm can be supplied into the biofilm treatment device.

Accordingly, according to the above-mentioned water treatment system, even when a certain length of time has elapsed from stoppage, it is possible to prevent the inside of the biofilm treatment device from becoming an anaerobic condition, activity of the microorganism of the biofilm from being decreased, or further, the microorganism of the biofilm from becoming nonexistent. For this reason, a predetermined performance of the membrane of the biofilm (a state of the biofilm) and a predetermined filtration performance of the biofilm treatment device can be precisely maintained in an appropriate state until the operation is restarted.

BRIEF DESCRIPTION OF DRAWINGS

FIG. 1 is a view showing a water treatment system according to an embodiment of the present invention.

DESCRIPTION OF EMBODIMENTS

Hereinafter, an embodiment of a water treatment system according to the present invention is described with reference to FIG. 1. Here, in the embodiment, the water treatment system according to the present invention will be described as a system that uses seawater serving as water to be treated. And the system configured to separate the seawater into concentrated water and fresh water using a reverse osmosis membrane (a RO membrane) to produce fresh water. Further, the water to be treated according to the present invention does not need to be limited to seawater. The present invention may be applied to treat another water to be treated such as river water or the like.

As shown in FIG. 1, a water treatment system A of the embodiment includes a pretreatment apparatus 1 and a reverse osmosis membrane device (a RO membrane apparatus) 2.

The pretreatment apparatus 1 removes suspended solids such as particulates, colloids, or the like, in the seawater 3, and microorganisms such as algae, shellfish, or the like, in the seawater 3. The pretreatment apparatus 1 is configured to prevent organisms such as algae, shellfish, or the like, from adhering to the water intake port, the pipeline, the waterway, and so on that are configured to collect the seawater 3 serving as the water to be treated. Further the pretreatment apparatus 1 is configured to suppress a fouling phenomenon in which water permeability of the reverse osmosis membrane device 2 is decreased.

The pretreatment apparatus 1 of the embodiment includes a biofilm treatment device 4 including a carrier having a biofilm formed on a surface of the carrier, an oxidizing agent-adding apparatus 5 configured to add an oxidizing agent such as hypochlorous acid or the like to the seawater 3, and a reducing agent-adding apparatus 6 configured to add a reducing agent such as sodium bisulfite (SIBS) or the like while measuring an oxidation-reduction potential. The reducing agent-adding apparatus 6 configured to neutralize the oxidizing agent.

For example, in a pre-stage of the water treatment system A in which the seawater 3 that is raw water serving as the water to be treated is collected and supplied to the biofilm treatment device 4, an oxidizing agent is added to the seawater 3 by the oxidizing agent-adding apparatus 5. As a result, the microorganisms or the like in the seawater 3 become extinct by adding the oxidizing agent, and then, organisms such as algae, shellfish, or the like, are prevented from being adhered to the water intake port, the pipeline, the waterway, and so on. In addition, in the pre-stage before supplying the seawater 3 to which the oxidizing agent is added by the biofilm treatment device 4, the reducing agent is added to the seawater 3 by the reducing agent-adding apparatus 6. In the result, the oxidizing agent remaining in the seawater 3 is neutralized. Accordingly, a decrease in membrane performance due to oxidation of the reverse osmosis membrane of the reverse osmosis membrane device 2 of the post-step of the water treatment system A caused by the oxidizing agent is prevented.

In addition, the biofilm treatment device 4 is disposed closer to an upstream side in a seawater distribution direction (a feed direction) than the reverse osmosis membrane device 2 to treat the seawater 3 before passing through the reverse osmosis membrane device 2. The biofilm treatment device (the biofilm filtration device) 4 of the embodiment is configured by filling a container with a carrier such as sand or the like on the surface of which the biofilm is formed. Accordingly, the biofilm treatment device (the biofilm filtration device) 4 has a filtration performance in addition to biodegradation and removal performance of the suspended solid by the microorganism of the biofilm, a BOD element of another microorganism or the like.

Meanwhile, in the pretreatment apparatus 1 of the embodiment, in addition to the biofilm treatment device 4, the oxidizing agent-adding apparatus 5 and the reducing agent-adding apparatus 6, a circulation device 7 upon stoppage of the water to be treated, a supply device 8 upon stoppage of the water to be treated, a monitoring unit 9, a control unit 10 and an oxygen nutriment supply unit 11 that are operated when the system plant is stopped due to inspection, contingencies, or the like, and intake of the new seawater 3 is stopped are provided. Further, in the water treatment plant according to the present invention, either the circulation device 7 upon stoppage of the water to be treated or the supply device 8 upon stoppage of the water to be treated may be provided.

The circulation device 7 upon stoppage of the water to be treated includes a circulation path 7a and a conveying pump 7b that is a circulation driving source. The circulation path 7a having a pipeline, a tank, and so on, configured to supply and circulate the seawater 3 of the water to be treated from a discharge port 4a for the water to be treated side (a lower side) to the supply port 4b for the water to be treated side (an upper side) of the biofilm treatment device 4 upon stoppage of intake of new seawater 3. Further, the circulation device 7 may be configured to supply and circulate the seawater 3 from the supply port 4b for the water to be treated side (the upper side) to the discharge port 4a for the water to be treated side (the lower side) of the biofilm treatment device 4.

The supply device 8 upon stoppage of the water to be treated includes a supply path 8a and a feeding pump 8b that is a supply driving source. The supply path 8a having a pipeline, a tank, and so on, configured to supply the new seawater 3 to the biofilm treatment device 4 upon stoppage of intake of the new seawater 3 using the new seawater 3, for example, separately prepared, the new seawater 3 held in a plant upon the stoppage, or the like. In the embodiment, the supply device 8 is configured to supply the new seawater 3 from the supply port 4b for the water to be treated side (the upper side) of the biofilm treatment device 4. The supply device 8 may be configured to supply the new seawater 3 from be discharge port 4a for the water to be treated side (the lower side) of the biofilm treatment device 4.

The monitoring unit 9 samples the seawater 3 from the biofilm treatment device 4, the circulation path 7a of the circulation device 7 or the supply path 8a of the supply device 8. The monitoring unit 9 measures ingredients in the seawater 3 consumed by the biofilm in the seawater 3, i.e., ingredients required for growth and development of the microorganism of the biofilm and existing in the seawater 3, for example, nutriments such as oxygen, phosphorus, nitrogen, organic matter, or the like. Accordingly, the monitoring unit 9 is monitored whether the seawater 3 in the biofilm treatment device 4 is in a state appropriate for the microorganism of the biofilm and whether the biofilm (activity of the biofilm, the number of microorganisms, or the like) is in an appropriate state. Specifically, items measured by the monitoring unit 9 are, for example, a dissolved oxygen content (DO), a chemical oxygen demand (COD), a biochemical oxygen demand (BOD), total organic carbon (TOC), and so on. In addition, a silt density index (SDI), a silting index (SI), a dirt index (FI), and so on, may be selectively measured.

The control unit 10 mainly controls operation and stoppage of the circulation device 7, the supply device 8 and the monitoring unit 9. In addition, the control unit 10 detects, for example, stoppage of the system plant due to inspection, contingencies, or the like, or a predetermined time elapsed from the stoppage, and receives a control signal that informs of these situations. The control unit 10 receives the control signal to operate and control the circulation device 7 and the supply device 8 (the conveying pump 7b and the feeding pump 8b).

The oxygen nutriment supply unit 11 is installed to be connected to the biofilm treatment device 4, the circulation path 7a of the circulation device 7 or the supply path 8a of the supply device 8.

The oxygen nutriment supply unit 11 selectively supplies oxygen (air, a gas including oxygen) and a nutriment of the microorganism that forms the biofilm to the seawater 3 is circulated by the circulation device 7 and the new seawater 3 is supplied by the supply device 8 upon operation of the circulation device 7 and the supply device 8.

Further, the oxygen nutriment supply unit 11 may be constituted by an oxygen supply unit 11a configured to supply only a gas including oxygen, and a nutriment supply unit 11b configured to supply only a nutriment. In addition, the oxygen nutriment supply unit 11 may be constituted by only one of the oxygen supply unit 11a and the nutriment supply unit 11b.

The oxygen nutriment supply unit 11 (the oxygen supply unit 11a) includes an oxygen supply source such as a compressor, an oxygen cylinder, an air cylinder, or the like, and a pipeline configured to connect the oxygen supply source to the biofilm treatment device 4, the circulation path 7a of the circulation device 7 or the supply path 8a of the supply device 8. In addition, the oxygen nutriment supply unit 11 (the nutriment supply unit 11b) includes a nutrient solution tank configured to store a nutrient solution including nutriments, a pipeline configured to connect the nutrient solution to the biofilm treatment device 4, the circulation path 7a of the circulation device 7 or the supply path 8a of the supply device 8, and a nutrient solution pump configured to pump the nutrient solution from the nutrient solution tank through the pipeline.

The oxygen nutriment supply unit 11 of the embodiment is disposed to supply the oxygen (the gas including oxygen) from a lower side of the discharge port 4a for the water to be treated side of the biofilm treatment device 4.

That is the oxygen nutriment supply unit 11 (the oxygen supply unit 11a) is disposed to connect the pipeline to a lower section of the discharge port 4a for the water to be treated side of the biofilm treatment device 4, the discharge port 4a for the water to he treated side of the circulation path 7a of the circulation device 7 or the discharge port 4a for the water to be treated side of the supply path 8a of the supply device 8. Accordingly, the oxygen supplied from the oxygen nutriment supply unit 11 is supplied while floating to the inside of the biofilm treatment device 4 from the lower section toward the upper section.

In the embodiment, a supply amount of the new seawater 3 supplied by the supply device 8 and a supply amount of the gas including oxygen and the nutriment of the microorganism selectively supplied by the oxygen nutriment supply unit 11 are controlled by the control unit 10 based on the monitoring result by the monitoring unit 9.

The reverse osmosis membrane device 2 is constituted by, for example, a plurality of reverse osmosis membrane elements (reverse osmosis membrane units) installed in the container. The seawater 3 after treatment by the pretreatment apparatus 1 is supplied into the reverse osmosis membrane elements of the reverse osmosis membrane device 2. In the reverse osmosis membrane device 2, the seawater 3 is separated into concentrated water 12 and fresh water 13 by the reverse osmosis membranes of the reverse osmosis membrane elements to be discharged from the container. Accordingly, the fresh water 13 is produced. Further, the water treatment system A may be configured to send the concentrated water 12 to an electrodialysis apparatus or an evaporator, generate sodium chloride or bittern, and extract and collect potassium, bromine, boron, and so on, contained in the seawater 3 as valuables.

In the water treatment system A of the embodiment constituted by the above-mentioned configuration when the system plant is stopped due to inspection, contingencies, or the like, and intake of the new seawater 3 is stopped, an operation command from the control unit 10 is issued. In the water treatment system A of the embodiment, the seawater 3 is circulated and supplied into the biofilm treatment device 4 by the circulation device 7 based on the operation command. In addition, the new seawater 3 is supplied into the biofilm treatment device 4 using the new seawater 3 that is previously separately prepared, the new seawater 3 held in the plant upon stoppage, and so on, by the supply device 8.

Here, the control unit 10 of the embodiment receives the monitoring result of the monitoring unit 9. The control unit 10 operates either the circulation device 7 or the supply device 8 based on the monitoring result. Further, the control unit 10 stops the circulation device 7 and the supply device 8 when it is determined based on the monitoring result that the ingredients such as oxygen, nutriments, or the like, required for growth and development of the microorganism of the biofilm are present in the seawater 3 in the biofilm treatment device 4 and the state of the biofilm is appropriate. That is, the control unit 10 can also intermittently operate the circulation device 7 upon stoppage of the water to be treated and the supply device 8 upon stoppage of the water to be treated.

For example, the ingredients such as oxygen, nutriments, or the like, in the seawater 3 are varied by seasons, times (the rise and tall of the tide), or the like. For this reason, the control unit 10 controls the operations of the circulation device 7 and the supply device 8 based on past data such as seasonal conditions or the like.

In this way, as the circulation device 7 and the supply device 8 are operated, the seawater 3 is circulated in the biofilm treatment device 4 or the new seawater 3 is supplied. Thus, oxygen, nutriments, or the like required for the microorganism of the biofilm is supplied into the biofilm treatment device 4, even, when the system plant is stopped due to inspection, contingencies, or the like.

For this reason, in the water treatment system A of the embodiment, even when a certain length of time has elapsed from the stoppage, the inside of the biofilm treatment device 4 does not becomes an anaerobic condition, activity of the microorganism of the biofilm is not decreased, or further, the microorganism of the biofilm does not become extinct.

When the seawater 3 is supplied and circulated from the discharge port 4a for the water to be treated side of the biofilm treatment device 4 toward the supply port 4b for the water to be treated upon stoppage of the intake of the new seawater 3 by the circulation device 7, the seawater 3 flows to become backwash (backflow washing). For this reason, the filtration performance of the biofilm treatment device 4 can also be restored and improved by the circulation device 7 upon stoppage of the water to be treated. Even in the supply device 8 upon stoppage of the water to be treated, when the new seawater 3 is supplied from the discharge port 4a for the water to be treated side of the biofilm treatment device 4, the seawater 3 flows to become backwash. For this reason, even in the supply device 8, the filtration performance of the biofilm treatment device 4 can be restored and improved.

In addition, in the water treatment system A of the embodiment, not only the seawater 3 is circulated and supplied into the biofilm treatment device 4 by the circulation device 7 and the supply device 8 but also the oxygen (the gas including oxygen) and the nutriment are selectively supplied to the seawater 3 circulated and supplied into the biofilm treatment device 4 by the oxygen nutriment supply unit 11.

When the seawater 3 is circulated by the circulation device 7, since the oxygen and nutriments in the seawater 3 are gradually consumed by the microorganism of the biofilm of the biofilm treatment device 4, the oxygen and nutriment should be supplemented. For this reason, based on the measurement result of the monitoring unit 9, oxygen (the gas including oxygen) is supplied when the oxygen is insufficient, the nutriment is supplied when the nutriment is insufficient, and both of the oxygen and nutriment are supplied when the oxygen and nutriment are insufficient by the oxygen nutriment supply unit 11. Accordingly, the biofilm in the biofilm treatment device 4 can be maintained in an appropriate state.

When the new seawater 3 is supplied by the supply device 8, the nutriment is sufficiently included in the new seawater 3. For this reason, oxygen (the gas including oxygen) is supplied by the oxygen nutriment supply unit 11. However, when the nutriment is insufficient, of course, the nutriment is supplied.

Here, in the embodiment, the oxygen is supplied from a lower side of the biofilm treatment device 4 by the oxygen nutriment supply unit 11. When the oxygen is supplied from the lower side in this way, the gas including oxygen is supplied to flow through the biofilm treatment device 4 while floating. For this reason, the supplied oxygen is widely diffused and supplied into the biofilm treatment device 4, and the oxygen is supplied into the entire biofilm in the biofilm treatment device 4. As the gas including oxygen is supplied into the biofilm treatment device 4 while floating, the inside of the biofilm treatment device 4 is agitated and mixed, and not only the oxygen but also the nutriment are widely supplied into the biofilm in the biofilm treatment device 4.

When the operation of the water treatment system A is restarted after termination of inspection or settlement of contingencies, the biofilm of the biofilm treatment device 4 is maintained in an appropriate state. Accordingly, the seawater 3 treated by the biofilm treatment device 4 is separated into the concentrated water 12 and the fresh water 13 by the reverse osmosis membrane while the seawater 3 is supplied into the reverse osmosis membrane device 2. Accordingly, the fresh water 13 is appropriately produced.

Accordingly, in the water treatment system A of the embodiment, when the system plant is stopped due to inspection, contingencies, or the like, and intake of the new seawater 3 is stopped, the seawater 3 can be circulated and supplied into the biofilm treatment device 4 by the circulation device 7. In addition, the new seawater 3 can be supplied into the biofilm treatment device 4 by the supply device 8, for example, using the new seawater 3 that is previously separately prepared, the new seawater 3 held in the plant upon stoppage, or the like.

Accordingly, even when the system plant is stopped due to inspection, contingencies, or the like, and intake of the new seawater 3 is stopped, as the circulation device 7 and the supply device 8 are appropriately operated, the oxygen, nutriment, or the like required for the microorganism of the biofilm can be supplied into the biofilm treatment device 4. As a result, the biofilm can be maintained in an appropriate state.

Accordingly, according to the water treatment system A of the embodiment, even when a certain length of time has elapsed from stoppage, it is possible to prevent the inside of the biofilm treatment device 4 from becoming an anaerobic condition, activity of the microorganism of the biofilm from becoming decreased, or further, the microorganism of the biofilm from becoming nonexistent. Accordingly, the membrane performance of the predetermined biofilm (the state of biofilm) and the filtration performance of the biofilm treatment device 4 can be securely maintained in an appropriate state until the operation is restarted.

In the water treatment system A of the embodiment, the ingredients in the seawater 3 consumed by the biofilm, i.e., the ingredients existing in the seawater 3 required for growth and development of the microorganism of the biofilm, for example, nutriments such as oxygen, phosphorus, nitrogen, organic matter, or the like, are monitored by the monitoring unit 9. As a result, in the water treatment system A of the embodiment, the ingredient amount in the seawater 3 in the biofilm treatment device 4 can be checked. Accordingly, the state of the microorganism of the biofilm (activity or the number of microorganisms, and so on) can be checked. Based on this, determination of operation or stoppage of the circulation device 7 or the supply device 8 can be appropriately performed.

In the water treatment system A of the embodiment, the control unit 10 configured to control operation and stoppage of at least one of the circulation device 7 and the supply device 8 is provided. Accordingly, for example, stoppage of the system plant due to inspection, contingencies, or the like, or the predetermined time elapsed from the stoppage are detected, and simultaneously, the control unit 10 can control an operation of at least one of the circulation device 7 and the supply device 8.

During stoppage of the system plant, the amount of the ingredient such as oxygen, nutriment, or the like, in the seawater 3 required for growth and development of the microorganism of the biofilm is monitored by the monitoring unit 9 or the like. Based on this, at least one of the circulation device 7 and the supply device 8 can be intermittently operated or stopped by the control unit 10.

It is also considered that the ingredients such as oxygen, nutriment, or the like in the seawater 3 are varied according to, for example, seasons, times, the rise and fall of the tide, or the like. For this reason, based on the seasonal conditions, at least one of the circulation device 7 and the supply device 8 can also be controlled to be operated by the control unit 10.

Accordingly, the performance of the biofilm treatment device 4 can be efficiently and economically maintained.

In the water treatment system A of the embodiment, the oxygen (the gas including oxygen) and the nutriment can be selectively supplied to the seawater 3 circulated and supplied into the biofilm treatment device 4 by the oxygen nutriment supply unit 11. Accordingly, for example, only the oxygen is supplied when the new seawater 3 is supplied by the supply device 8, and both of the oxygen and the nutriment are supplied or an insufficient one of the oxygen and the nutriment is supplied when the seawater 3 is circulated by the circulation device 7. That is, the oxygen and the nutriment can be selectively supplied to the seawater 3. Accordingly, the biofilm can be maintained in an appropriate state with high precision.

As the oxygen (the gas including oxygen) is supplied from the lower side of the biofilm treatment device 4 by the oxygen nutriment supply unit 11, the oxygen can be supplied into the biofilm treatment device 4 while floating. Accordingly, the oxygen is prevented from being locally supplied into the biofilm treatment device 4 and the oxygen can be widely supplied into the biofilm treatment device 4. For this reason, the biofilm can be maintained in an appropriate state with high precision. In addition, as the gas including oxygen is supplied into the biofilm treatment device 4 while floating as described above, an action of agitating and mixing the inside of the biofilm treatment device 4 is also obtained. Accordingly, not only the oxygen but also the nutriment can be widely supplied into the biofilm treatment device 4.

Based on the monitoring result by the monitoring unit 9, the supply amount of the new seawater 3 by the supply device 8 and the supply amount of the gas including oxygen and the nutriment selectively supplied by the oxygen nutriment supply unit 11 are controlled. Accordingly, the biofilm can be maintained in an appropriate state with high precision. Further, the supply amount of the new seawater 3 by the supply device 8 and the supply amount of the gas including oxygen and the nutriment selectively supplied by the oxygen nutriment supply unit 11 can be automatically controlled by the control unit 10 that has received the monitoring result. In this case, the biofilm can be more efficiently and effectively maintained.

Hereinabove, while the embodiment of the water treatment system according to the present invention has been described, the present invention is not limited to the above-mentioned embodiment but may be appropriately varied without departing from the spirit of the present invention.

INDUSTRIAL APPLICABILITY

According to the water treatment system, even when a certain length of time has elapsed from stoppage, it is possible to prevent the inside of the biofilm treatment device from becoming an anaerobic condition, activity of the microorganism of the biofilm from being decreased, or further, the microorganism of the biofilm from becoming nonexistent. For this reason, the predetermined membrane performance of the biofilm (the state of the biofilm) and the filtration performance of the biofilm treatment device can be maintained in an appropriate state with high precision until the operation is restarted.

REFERENCE SIGNS LIST

1 pretreatment apparatus
2 reverse osmosis membrane device
3 seawater (new seawater, water to be treated)
4 biofilm treatment device (biofilm filtration device)
4*a* water to be treated discharge port (lower side)
4*b* water to be treated supply port (upper side)
5 oxidizing agent-adding apparatus
6 reducing agent-adding apparatus
7 water to be treated stoppage period circulation device (circulation device)
7*a* circulation path
7*b* conveying pump
8 water to be treated stoppage period supply device (supply device)
8*a* supply path
8*b* feeding pump
9 monitoring unit
10 control unit
11 oxygen nutriment supply unit
11*a* oxygen supply unit
11*b* nutriment supply unit
12 concentrated water
13 fresh water
A water treatment system

The invention claimed is:

1. A water treatment system comprising:
    a reverse osmosis membrane device configured to separate water into concentrated water having high solute concentration and fresh water;
    a biofilm treatment device comprising a supply port, a discharge port and a carrier having biofilm formed on a surface thereof, the biofilm treatment device configured to treat the water before passing through the reverse osmosis membrane device;
    a water supply pipe for supplying seawater to the biofilm treatment device;
    a water stoppage period circulation device configured to supply and circulate water from the discharge port of the biofilm treatment device toward the supply port or from the supply port toward the discharge port;
    a water stoppage period supply device configured to supply water to the biofilm treatment device;
    an oxygen nutriment supply unit configured to selectively supply oxygen and nutriment that forms the biofilm to the biofilm treatment device;
    a monitoring unit configured to sample water from the biofilm treatment device, the water stoppage period circulation device and the water stoppage period supply device; and
    a control unit configured to control operation and stoppage of the water stoppage period circulation device, the water stoppage period supply device and the monitoring unit such that
    when supplying of the seawater from the supply pipe is stopped, either the water stoppage period circulation device is operated or water is supplied from the water stoppage period supply device.

2. The water treatment system according to claim 1, wherein the monitoring unit is configured to monitor ingredients in the water consumed by the biofilm of the biofilm treatment device.

3. The water treatment system according to claim 1, wherein the control unit is configured to control operation and stoppage of at least one of the water stoppage period circulation device and the water stoppage period supply device.

4. The water treatment system according to claim 2, wherein the control unit is configured to control operation and stoppage of at least one of the water stoppage period circulation device and the water stoppage period supply device.

5. The water treatment system according to claim 1, wherein the oxygen nutriment supply unit is configured to selectively supply a gas including oxygen and a nutriment of a microorganism that forms the biofilm to at least one of water circulated by the water stoppage period circulation device and water supplied by the water stoppage period supply device when at least one of the water stoppage period circulation device and the water stoppage period supply device is operated.

6. The water treatment system according to claim 2, wherein the oxygen nutriment supply unit is configured to selectively supply a gas including oxygen and a nutriment of a microorganism that forms the biofilm to at least one of water circulated by the water stoppage period circulation device and water supplied by the water stoppage period supply device when at least one of the water stoppage period circulation device and the water stoppage period supply device is operated.

7. The water treatment system according to claim 3, wherein the oxygen nutriment supply unit is configured to selectively supply a gas including oxygen and a nutriment of a microorganism that forms the biofilm to at least one of water circulated by the water stoppage period circulation device and water supplied by the water stoppage period supply device when at least one of the water stoppage period circulation device and the water stoppage period supply device is operated.

8. The water treatment system according to claim 5, wherein the oxygen nutriment supply unit supplies the gas including oxygen from a lower side of the discharge port of the biofilm treatment device.

9. The water treatment system according to claim 6, wherein the oxygen nutriment supply unit supplies the gas including oxygen from a lower side of the discharge port of the biofilm treatment device.

10. The water treatment system according to claim 7, wherein the oxygen nutriment supply unit supplies the gas including oxygen from a lower side of the discharge port of the biofilm treatment device.

11. The water treatment system according to claim 5, wherein a supply amount of the water supplied by the water stoppage period supply device and a supply amount of the gas including oxygen and the nutriment of the microorganism selectively supplied by the oxygen nutriment supply unit are controlled based on a monitoring result by the monitoring unit.

12. The water treatment system according to claim 8, wherein a supply amount of the water supplied by the water stoppage period supply device and a supply amount of the gas including oxygen and the nutriment of the microorganism selectively supplied by the oxygen nutriment supply unit are controlled based on a monitoring result by the monitoring unit.

* * * * *